(No Model.)
G. W. HARRIS & R. J. HOLLAND.
SECONDARY BATTERY AND PROCESS OF FORMING SAME.
No. 574,417. Patented Jan. 5, 1897.
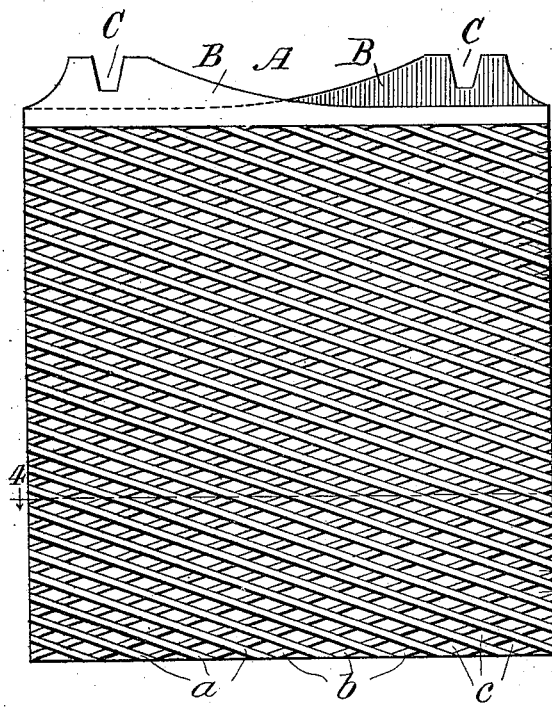
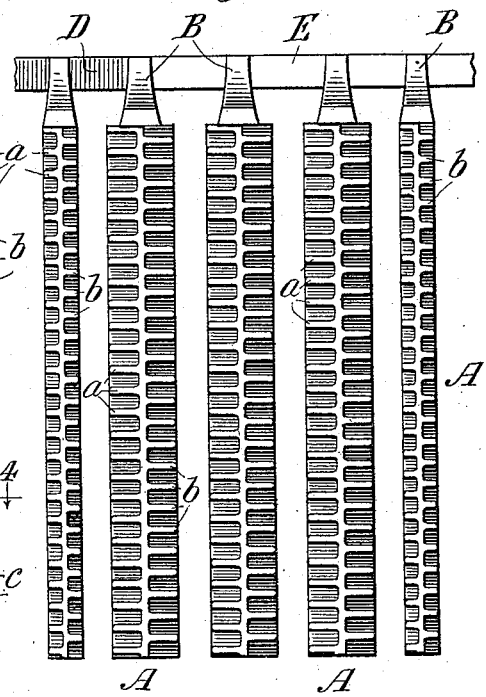
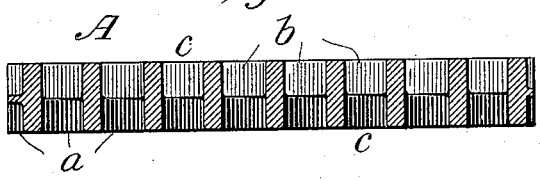
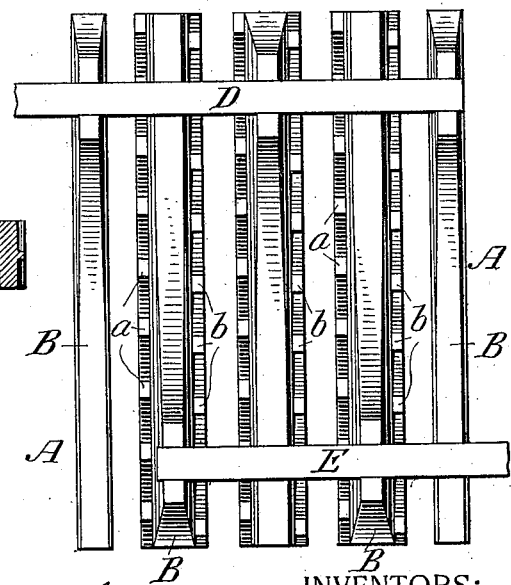
WITNESSES:
C. E. Ashley
H. W. Lloyd
INVENTORS:
Geo. W. Harris & Rich'd J. Holland
By their Attorney

UNITED STATES PATENT OFFICE.

GEORGE W. HARRIS AND RICHARD J. HOLLAND, OF NEW YORK, N. Y.

SECONDARY BATTERY AND PROCESS OF FORMING SAME.

SPECIFICATION forming part of Letters Patent No. 574,417, dated January 5, 1897.

Application filed January 30, 1896. Serial No. 577,431. (No model.)

*To all whom it may concern:*

Be it known that we, GEORGE W. HARRIS, a citizen of the United States, and RICHARD J. HOLLAND, a citizen of Canada and a subject of the Queen of Great Britain, both residing at New York, in the county of New York and State of New York, have invented certain new and useful Improvements in Secondary Batteries and Processes of Forming Same, of which the following is a specification, reference being had therein to the accompanying drawings.

Our invention has for its object to provide improved electrode-plates for use in storage or secondary batteries of such construction as to have the greatest possible capacity consistent with proper strength and durability, so that the peroxid of lead or active material will be so distributed as to present the greatest possible amount of surface to the action of the electrolyte.

Our invention also comprises an improved Planté "formation" process whereby the greatest possible durability consistent with the greatest possible expedition in "forming" is given to the formed plates.

In the accompanying drawings, Figure 1 is a side view representing two of our improved electrode-plates, one being behind and of opposite polarity to the other. Fig. 2 represents a battery of these plates, the latter being shown in end view. Fig. 3 is a top view of the battery represented in Fig. 2; and Fig. 4 is a cross-section, on lines 4 4 of Fig. 1, of one of our improved electrodes.

A denotes an electrode-plate consisting of a single integral piece of lead, each of these plates being provided at its top with a lug B, having a notch C for the reception of a connecting-bar D or E, the last-named bar, as shown in Figs. 2 and 3, being the positive connecting-bar, while D is the negative connecting-bar. These connecting-bars are burned into the lugs B in the usual manner. In the battery represented by Figs. 2 and 3 we have shown five electrode-plates, two positives and three negatives, the outer negative plates being of about one-half the capacity of the inner ones, so as to equally balance the battery. Each of the plates A is composed of two series of oppositely-inclined ribs, (one series on either side of the electrode or plate,) alternating with grooves, the ribs $a$ on one side of the plate being inclined oppositely to the ribs $b$ on the other side thereof, so that these two series of ribs intersect each other at short intervals and are bodily joined to each other only at their points of intersection, thereby forming a skeleton-like structure with openings $c$ between their points of intersection. The ribs $a$ and $b$ are of rectangular or quadrilateral form in cross-section. The grooves alternating with the ribs on one side of the plate extend to the grooves on the opposite side of the plate, thereby forming an open-work or skeleton structure with openings $c$ through the plate between the points of intersection of the ribs $a$ and $b$. The grooves which alternate with the ribs $a$ and $b$ on both sides of the plate are open to the edges of the plate at the sides and bottom, thereby producing what may be termed a "practically borderless plate," as the grooves are closed or partly closed only at the top edges of the plates by the lugs B.

The plates are preferably made in such a way that the ribs terminating at the edges thereof alternate with each other, as shown more clearly in Fig. 2. The grooves are extended out, so as to be open at the side and bottom edges of the plate, in order to overcome the tendency of the latter to buckle during forming, as also during excessive charging and discharging. The object in constructing the plates with oppositely-inclined ribs and grooves on their opposite sides, and with the grooves on one side extending to the grooves on the other to form an open-work or skeleton plate, is, first, to secure the greatest possible strength in proportion to weight; second, the greatest possible surface and capacity in proportion to the amount of material required in their construction. Furthermore, the open-work structure of our plates affords free circulation of the electrolyte during the process of forming, as well as in the operation of charging and discharging.

Our improved plates may be made either by casting, rolling, or sawing out to form the grooves between the ribs.

Our improved process of formation is as follows: In the case of cast plates it is advisable, first, to immerse them for a short time in a bath that produces on said plates a thin coating of lead sulfate. This bath is composed of dilute sulfuric acid (which is practically a non-solvent of lead) and an acid (preferably acetic or nitric) which is a solvent of lead. This step, however, is not positively essential and may be dispensed with, its object being merely to secure greater uniformity of electrochemical action in the formation of cast plates in which there is a lack of uniformity of molecular structure. The plates, either with or without the treatment just referred to, are then formed by being subjected to the action of an electric current in an electrolyte or bath consisting, preferably, of a moderately strong solution of magnesium sulfate or its equivalent, as aluminium sulfate, and proportionately small quantities of sulfuric and acetic acids and magnesium acetate or equivalents therefor; but the substances mentioned are preferred, as they give the best results, so far as is known to us. The essentially new result of this process of formation with the combination of substances above stated constituting the electrolyte is the production on the surfaces of the electrode during forming of a salt of lead, (lead sulfate,) which is insoluble or difficultly soluble in the electrolyte, but which salt of lead, by virtue of the substances composing the electrolyte, is capable of being converted into peroxid of lead. Thus the use of magnesium sulfate and magnesium acetate or their equivalents is to facilitate the peroxidation of the otherwise difficultly peroxidizable sulfate. Thus the two main actions proceed simultaneously during formation, to wit: the constant production of sulfate of lead over the surface of the electrodes and a constant though somewhat slower peroxidation of the lead-sulfate coating at its outer surface.

In order to make clear the sense in which we use the term "equivalent" or "equivalents" in the preceding, and to show the scope of our process of formation, as to the various combinations of substances that may be used to constitute compound electrolytes that are strictly similar or analogous in composition to the one we give above as the preferable, we add the following by way of explanation. Thus, starting out with any particular acid that is non-solvent or a poor solvent of lead—for example, sulfuric acid—with this particular acid we may use any one of a series of suitable metallic sulfates—for example, magnesium sulfate—with, next, any one of a series of suitable acids that are ready solvents of lead—for example, acetic acid—with, lastly, a corresponding salt for the lead solvent—viz., magnesium acetate. If we use in place of magnesium sulfate aluminium sulfate, then the corresponding salt for the acid solvent of lead becomes aluminium acetate. If we vary the acid solvent of lead, say to nitric in place of acetic, then the corresponding salt used will be magnesium or aluminium nitrate, and so on. It is thus seen that many suitable compound electrolytes are available by the use of one particular acid that is a non-solvent or a poor solvent of lead. We do not limit ourselves, however, to the use of sulfuric acid as the only non-solvent acid that we can use in our chemical and electrochemical process of formation. Any other suitable acid that is a non-solvent or a poor solvent of lead may be used just in the same way as sulfuric. Thus, selenic acid might be used in place of sulfuric. The selenates would then be used instead of the sulfates, and lead selenate would be the insoluble or difficultly-soluble salt of lead produced during forming on the surface of the electrode. In some cases we may use two or more equivalent substances in the same compound electrolyte, or even compound two compound electrolytes prepared as above, without in any way altering the fundamental and essential feature of our process.

When the electrodes are sufficiently formed, they are preferably removed from the forming electrolyte or bath and washed to remove any retained portion of the bath just referred to, and are then subjected to the action of an electric current in an electrolyte or bath composed of dilute sulfuric acid and a proportionately small quantity of an acid sulfate, as that of sodium or potassium. The treatment in this last-named bath completes the formation of the electrodes as positives by converting any remaining portions of the lead sulfate into peroxid. This treatment, however, does not increase the depth of formation. When thus fully formed, such of the positives as are intended to become negatives are "reduced" in this same electrolyte or bath by being connected with the negative terminal of the charging-current. The electrodes are then ready to be assembled to form cells and are then charged in the usual way.

By the above-described process well-formed highly-effective battery-plates can be formed from raw material in from thirty to fifty hours, the time depending, chiefly, on the strength of the forming-current. It is advisable, however, not to use too strong a current in forming.

Having thus described our invention, we claim and desire to secure by Letters Patent—

1. An electrode formed of a single integral piece of lead, for use in secondary or storage batteries, and consisting of an open-work or skeleton plate composed of oppositely-inclined intersecting or crossing ribs and grooves on its opposite sides, said ribs being of rectangular or quadrilateral form in cross-section, and the said grooves on one side of the plate extending to the grooves on the opposite side thereof, and all of said grooves being open at the side and bottom edges of the plate to make the latter borderless except at its top where it is provided with a lug as B, substantially as set forth.

2. The herein-described process of forming electrodes for secondary or storage batteries, consisting in subjecting lead plates to the action of an electric current in an electrolyte or bath composed of two acids, one of which acids is a solvent and the other of which is a non-solvent, or a poor solvent, of lead, together with one or more salts of each of said acids, and afterward subjecting the partly-formed electrodes to the action of an electric current in another electrolyte or bath composed of dilute sulfuric acid and an acid sulfate, substantially as described.

3. The herein-described process of forming electrodes for use in secondary or storage batteries consisting in subjecting lead plates to the action of an electric current in an electrolyte or bath composed of magnesium sulfate, sulfuric acid, acetic acid and magnesium acetate, and afterward subjecting the thus partly-formed electrode to the action of an electric current in another electrolyte composed of dilute sulfuric acid and an acid sulfate, substantially as described.

4. The herein-described process of forming electrodes for secondary or storage batteries, consisting in subjecting lead plates to the action of an electric current in an electrolyte or bath composed of a solution of magnesium sulfate and two acids, one of which acids is a solvent and the other of which is a non-solvent, or a poor solvent, of lead, together with a suitable metallic salt of the solvent acid, and afterward subjecting the partly-formed electrode to the action of an electric current in another electrolyte or bath composed of dilute sulfuric acid and an acid sulfate, substantially as described.

5. The herein-described process of forming electrodes for secondary or storage batteries, consisting in first subjecting the lead plates to an acid bath which will react thereon, to form a thin coating of lead sulfate, next subjecting the lead plates to the action of an electric current in an electrolyte or bath composed of a solution of magnesium sulfate and two acids, one of which acids is a solvent and the other of which acids is a non-solvent, or a poor solvent, of lead, together with a suitable metallic salt of the solvent acid, and afterward subjecting the partly-formed electrode to the action of an electric current in another electrolyte or bath composed of dilute sulfuric acid and an acid sulfate, substantially as described.

6. The herein-described process of forming electrodes for secondary or storage batteries, consisting in subjecting the lead plates to the action of an electric current in an electrolyte or bath composed of a solution of magnesium sulfate and two acids, one of which acids is a solvent, and the other of which acids is a non-solvent, or a poor solvent, of lead, together with a suitable metallic salt of the solvent acid, and afterward subjecting the partly-formed electrode to the action of an electric current in another electrolyte or bath composed of dilute sulfuric acid and an acid sulfate, and finally reducing positive electrodes, to form negatives, by subjecting said positives to the action of an electric current, from a negative terminal, in the last-mentioned electrolyte or bath, substantially as described.

In testimony whereof we affix our signatures in presence of two witnesses.

GEORGE W. HARRIS.
RICHARD J. HOLLAND.

Witnesses:
HENRY CALVER,
PAUL E. JOHNSON.